United States Patent [19]

Gaughan

[11] E Patent Number: Re. 33,545

[45] Reissued Date of Patent: Feb. 26, 1991

[54] PREPARATION OF A HIGH MOLECULAR WEIGHT POLY(ARYLENE SULFIDE KETONE)

[75] Inventor: Roger G. Gaughan, Piscataway, N.J.

[73] Assignee: Phillips Petroleum Company, Bartlesville, Okla.

[21] Appl. No.: 379,858

[22] Filed: Jul. 14, 1989

Related U.S. Patent Documents

Reissue of:

[64] Patent No.: 4,716,212
Issued: Dec. 29, 1987
Appl. No.: 905,615
Filed: Sep. 5, 1986

[51] Int. Cl.[5] ..... C08G 16/00; C08G 75/16

[52] U.S. Cl. ..... 528/226; 528/222; 528/224; 528/370; 528/371; 528/372; 528/373

[58] Field of Search ..... 528/226, 222, 224, 370, 528/371, 372, 373

[56] References Cited

U.S. PATENT DOCUMENTS

| | | | |
|---|---|---|---|
| 3,876,591 | 4/1975 | Campbell | 260/79.1 |
| 3,953,400 | 4/1976 | Dahl | 260/47 R |
| 4,232,142 | 11/1980 | Barr et al. | 528/125 |
| 4,361,693 | 11/1982 | Jansons | 528/86 |
| 4,415,729 | 11/1983 | Scoggins et al. | 528/388 |
| 4,716,212 | 12/1987 | Gaughn | 528/226 |

OTHER PUBLICATIONS

Chem. Abstracts, vol. 97, 1982, 216826z.

Indian Journal of Chemistry, D. Mukherjee et al., Section A, 1982, pp. 501-502.

*Primary Examiner*—Harold D. Anderson

*Attorney, Agent, or Firm*—Kenneth D. Goetz

[57] ABSTRACT

A process, and product produced therefrom, for preparing a high molecular weight poly(arylene sulfide ketone) from the reaction product of an alkali metal bisulfide with an alkali metal hydroxide, employing molar excess of alkali metal bisulfide with respect to the alkali metal hydroxide. A process, and product produced therefrom, for preparing a high molecular weight poly(arylene sulfide ketone) employing an alkali metal sulfide and an alkali metal hydrosulfide, wherein the alkali metal [sulfide] *hydrosulfide* is added in a molar excess with respect to the alkali metal [hydrosulfide] *sulfide*.

12 Claims, 1 Drawing Sheet

PREPARATION OF A HIGH MOLECULAR WEIGHT POLY(ARYLENE SULFIDE KETONE)

Matter enclosed in heavy brackets [ ] appears in the original patent but forms no part of this reissue specification; matter printed in italics indicates the additions made by reissue.

*This is a reissue application of Ser. No. 905,615, filed Sept. 5, 1986, now U.S. Pat. No. 4,716,212, patented Dec. 29, 1987.*

FIELD OF THE INVENTION

This invention relates to a method for preparing poly-(arylene sulfide ketone)s. The invention further relates to poly(arylene sulfide ketone)s prepared from the reaction product of an alkali metal hydrosulfide with an alkali metal hydroxide. The invention further relates to poly(arylene sulfide ketone)s prepared employing an alkali metal sulfide and an alkali metal hydrosulfide. The invention also relates to fibers and other articles of manufacture prepared from these poly(arylene sulfide ketone)s.

BACKGROUND OF THE INVENTION

Poly(arylene sulfide ketone)s, PASK, are an important class of engineering thermoplastics. Poly(arylene sulfide ketone)s are of commercial interest for fil,m fiber, moldings and composite applications because of their high melting points. One process for producing poly(arylene sulfide ketone)s involves the reaction of a dihalobenzophenone such as a dichlorobenzophenone with an alkali metal sulfide. The alkali metal sulfide is prepared by the reaction of an alkali metal hydrosulfide with an alkali metal hydroxide using virtually precise equimolar amounts (stoichiometric amounts) of the alkali metal hydrosulfide with respect to the alkali metal hydroxide, since an excess of either component has been considered undesirable.

However, a major disadvantage with the poly(arylene sulfide ketone)s has been a relatively low molecular weight. It would be most desirable to be able to produce poly(arylene sulfide ketone)s having a relatively high molecular weight. The high molecular weight poly(arylene sulfide ketone)s would exhibit improved impact strength and toughness when compared to low molecular weight poly(arylene sulfide ketone)s.

It is an object of my invention to provide a process for preparing a high molecular weight poly(arylene sulfide ketone). It is a further object of my invention to prepare high molecular weight poly(arylene sulfide ketone)s.

SUMMARY OF THE INVENTION

I have discovered that relatively high molecular weight poly(arylene sulfide ketone)s are prepared by contacting in a reaction mixture, preferably in a polar solvent, a polyhalobenzophenone and an alkali metal hydrosulfide present in a small but important closely defined amount over the stoichiometric amount of alkali metal sulfide needed in the condensation polymerization.

In a first embodiment, presently preferred, the alkali metal sulfide is prepared by bringing together an alkali metal hydrosulfide with an alkali metal hydroxide at a molar ratio of about 1.004:1 to about 1.038:1 so as to have the defined slight excess of alkali metal hydrosulfide.

In a further embodiment, I have discovered that high molecular weight poly(arylene sulfide ketone)s are prepared by contacting in a reaction mixture a polyhalobenzophenone, an alkali metal sulfide and an alkali metal hydrosulfide, preferably in a polar solvent, wherein an alkali metal [sulfide] *hydrosulfide* is brought together with an alkali metal [hydrosulfide] *sulfide* at a molar [ration] *ratio* of about [1.004:1] *0.004:1* to about [1.038:1] *0.038:1* under polymerization conditions effective for producing the poly(arylene sulfide ketone), again so as to have the defined slight excess of alkali metal hydrosulfide.

In either embodiment, or combination thereof, desired is about 0.004 to about 0.038 molar excess of alkali metal hydrosulfide relative to the polyhalobenzophenone, that is in addition to the alkali metal sulfide added or formed in situ.

Poly(arylene sulfide ketone)s having an inherent viscosity of at least about 0.48 are obtained by my processes for producing the poly(arylene sulfide ketone)s. This is unexpected in my experience when considering how important stoichiometry is for condensation polymerizations.

Figure 1:
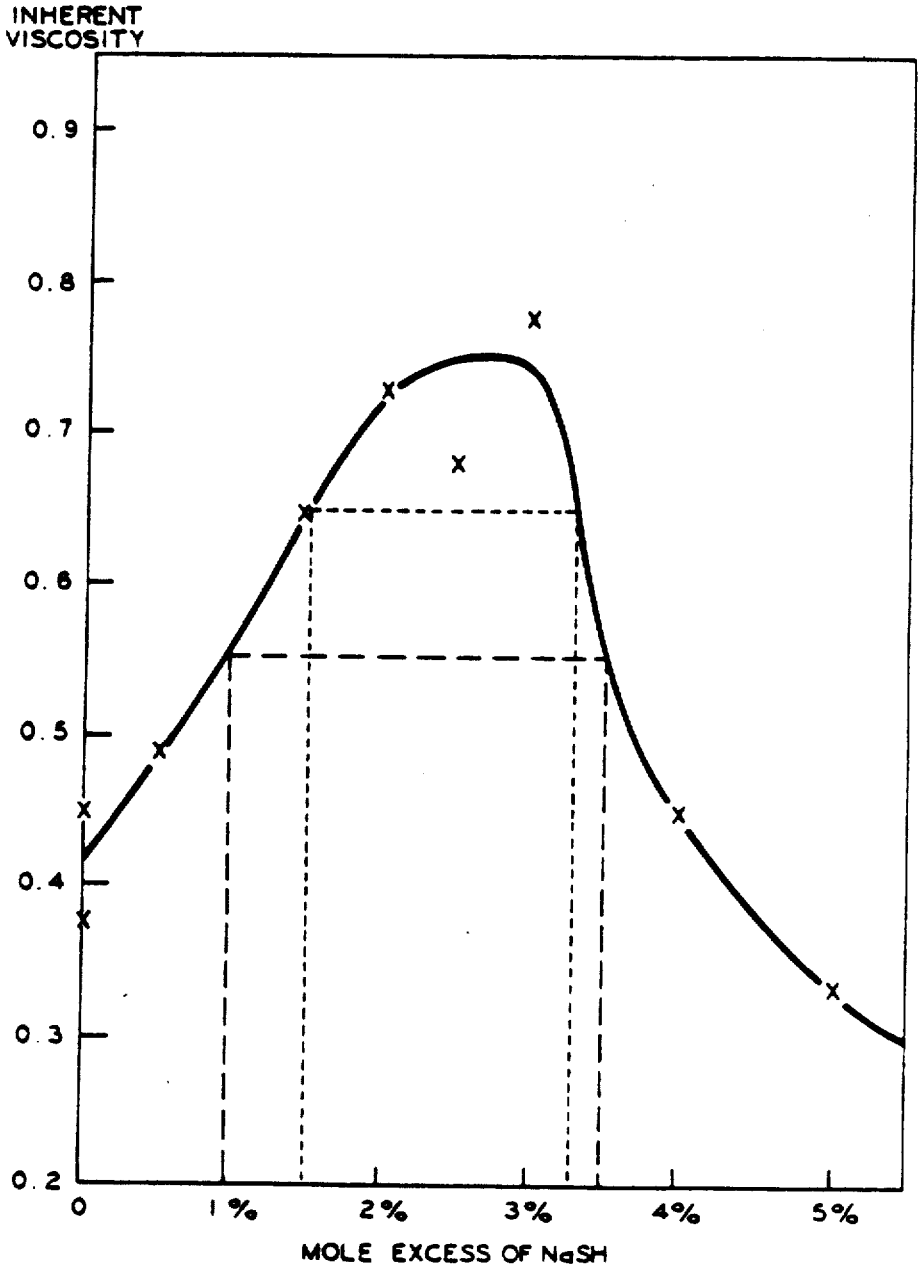
FIG. 1 is a graphical representation of the inherent viscosity of poly(phenylene sulfide ketone)s prepared in the condensation polymerization reaction employing a slight amount of sodium bisulfide (sodium hydrosulfide (NaSH) in a reaction mixture containing 4,4'dichlorobenzophenone, sodium sulfide ($Na_2S$), and N-methyl-2-pyrrolidone (NMP). The graph indicates by the portion between the larger dashed lines that poly(-phenylene sulfide ketone)s having an inherent viscosity of at least about 0.55 are obtained when a slight molar excess of NaSH of about 1 to about 3.5 mole percent over that needed to form $Na_2S$ was employed in the reactionmixture. The graph indicates by the portion between the shorter dashed lines that poly(phenylene sulfide ketone)s having an inherent viscosity of at least about 0.65 are obtained when a molar excess of NaSH of about 1.5 to about 3.3 mole percent was employed in the reaction mixture.

These results are in sharp contrast to poly(phenylene sulfide ketone)s having an inherent viscosity of less than about 0.45 prepared employing an alkali metal bisulfide with an alkali metal hydroxide at a stoichiometric molar ratio of about 1:1, thus no excess NaSH, and at a higher ratio of about 1.05:1. Only the narrow ratio was effective.

DETAILED DESCRIPTION OF THE INVENTION

In accordance with my invention, poly(arylene sulfide ketone)s are prepared by contacting in a reaction mixture (a) at least one polyhalobenzophenone, (b) at least one alkali metal sulfide either added as such or the equivalent in situ from an alkali metal hydrosulfide and an alkali metal hydroxide or both, and (c) alkali metal hydrosulfide, preferably in a polar solvent.

In one embodiment, the alkali metal sulfide employed in the process of my invention can be prepared from an alkali metal hydrosulfide and an alkali metal hydroxide in an aqueous solution using defined ratios. In a further embodiment, the alkali metal sulfide can be employed with the alkali metal hydrosulfide in an aqueous solution. In either embodiment the amount of the hydrosulfide is critical to the production of poly(arylene sulfide ketone)s of high inherent viscosity.

In the first embodiment, the reaction of a dihalobenzophenone, such as 4,4' dichlorobenzophenone, with an alkali metal sulfide, prepared from an alkali metal hydrosulfide and an alkali metal hydroxide, such as sodium hydrosulfide and sodium hydroxide, in a polar solvent, such as N-methyl-2-pyrrolidone (NMP), so as to form a poly(phenylene sulfide ketone) of repeating units of poly(phenylene sulfide ketone), can be represented by:

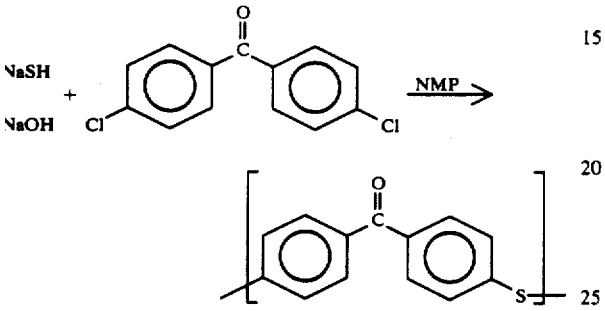

In the further embodiment, the polymerization employs a dihalobenzophenone, such as 4,4' dichlorobenzophenone, with an alkali metal sulfide, such as sodium sulfide, and an alkali metal hydrosulfide, such as sodium hydrosulfide, in a polar solvent, such as NMP, to form a poly(phenylene sulfide ketone) of repeating units of poly(phenylene sulfide ketone), can be represented by:

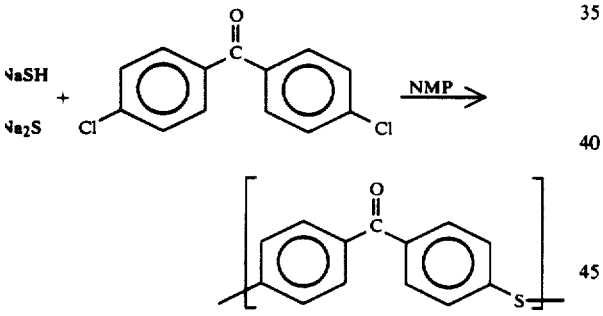

In my invention, a slight but essential molar excess of alkali metal hydrosulfide is employed with respect to the dihalobenzophenone or akali metal sulfide.

Although the molar excess of alkali metal hydrosulfide to alkali metal hydroxide can vary somewhat, generally when alkali metal hydrosulfide is employed with alkali metal hydroxide, it will be within the range of about 0.4 to about 3.8 mole percent, preferably within the range of about 1 to about 3.5 mole percent over the stoichiometric amount calculated to form alkali metal sulfide. The corresponding molar ratio of alkali metal hydrosulfide to alkali metal hydroxide will be in the range of about 1.004:1 to about 1.038:1, preferably within the range of about 1.01:1 to about 1.035:1.

In a further embodiment of my invention, an alkali metal hydrosulfide and an alkali metal sulfide are employed in a range of about 0.4 to [aobut] *about* 3.8 mole percent, preferably within the range of about 1 to about 3.5 mole percent, relative to the alkali metal sulfide amount as 100, again to assure a slight but essential excess of alkali metal hydrosulfide. The corresponding molar ratio of alkali metal hydrosulfide to alkali metal sulfide is in the range of about [1.004:1] *0.004:1* to about [1.038:1] *0.038:1*, preferably [int he] *in the* range of about [1.01:1] *0.01:1* to about [1.035:1] *0.035:1*.

The poly(arylene sulfide ketone)s prepared according to my processes will have an inherent viscosity of at least about 0.48, preferably from about 0.55 to about 0.77. The polymers have wide utility for film, fiber, moldings, and composite applications because of this high melting point and high molecular weight.

FIG. 1 is a graphical representation of the inherent viscosity of poly(phenylene sulfide ketone)s as representative of poly(arylene sulfide ketone)s prepared from the condensation reaction of a molar excess of NaSH with respect to NaOH of about 0 to about 5 moles percent in a polymerization mixture containing 4,4'dichlorobenzophenone and NMP. The graph indicates by the portion between the longer dashed line that poly(phenylene sulfide ketone)s having an inherent viscosity of at least about 0.55 are obtained when a molar excess of NaSH fo about 1 to about 3.5 mole percent was employed. The shorter dashed lines indicate that poly(phenylene sulfide ketone)s having an inherent viscosity of at least about 0.65 are obtained when a molar excess of NaSH versus NaOH of about 1.1 to 3.3 mole percent was employed. This is in sharp contrast to the poly(arylene sulfide ketone)s having an inherent viscosity of less than about 0.45 obtained by bringing together a dihalobenzophenone, an alkali metal bisulfide, and an alkali metal hydroxide at a stoichiometric molar ratio of about 1:1:1 and at a higher ratio of about 1:1.05:1.

My process employs a polyhalobenzophenone, preferably a dihalobenzophenone. The dihalobenzophenones can be represented by the formula:

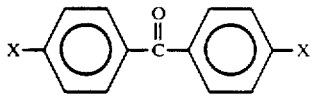

wherein each X is selected from the group consisting of chlorine, bromine, fluorine, and iodine. Among the polyhalobenzophenones which can be employed are 4,4'dichlorobenzophenone, 4,4'difluorobenzophenone, 4,4'dibromobenzophenone, 4,4'diiodobenzophenone, 2,4'dichlorobenzophenone, 2,4,4'trichlorobenzophenone, 2,4,4'triiodobenzophenone, 2,4,4'trifluorobenzophenone, 2,4,4'tribromobenzophenone, and the like, and mixtures thereof. The presently preferred dihalobenzophenone, due to its effectiveness and commercial availability, is 4,4'dichlorobenzophenone.

The alkali metal sulfides include lithium sulfide, sodium sulfide, potassium sulfide, rubidium sulfide, cesium sulfide, and mixtures thereof. The alkali metal hydrosulfides (sometimes called bisulfides) include lithium hydrosulfide, sodium hydrosulfide, potassium hydrosulfide, rubidium hydrosulfide, cesium hydrosulfide, and mixtures thereof. The alkali metal hydroxides include lithium hydroxide, sodium hydroxide, potassium hydroxide, rubidium hydroxide, cesium hydroxide, and mixtures thereof.

The preferred alkali metal sulfide, due to its effectiveness, is sodium sulfide ($Na_2S$). The preferred alkali metal hydrosulfide, due to its effectiveness, is sodium hydrogen sulfide (NaSH). The preferred alkali metal hydroxide, due to its effectiveness, is sodium hydroxide (NaOH).

The molar ratio of dihalobenzophenone: alkali metal sulfide should be held as close to stoichiometric ratio of 1:1 as possible in the condensation polymerization.

The solvents useful in the process of my invention are polar organic solvents which can be used with a dihalobenzophenone and an alkali metal sulfide in the production of poly(arylene sulfide ketone)s. These polar organic solvents include such as the amides and sulfones. Specific examples of such polar organic solvents include hexamethyl phosphoramide, tetramethylurea, N,N'-ethylenedipyrrolidone, N-methyl-2-pyrrolidone (NMP), pyrrolidone, caprolactam, N-ethylcaprolactam, sulfolane, N,N'-dimethylacetamide, diphenyl sulfone, and the like, and mixtures thereof. The preferred polar organic solvent, due to its effectiveness and commercial availability, is NMP. The amount of solvent can vary, as is known in the art.

The order of addition of the ingredients used to prepare the poly(arylene sulfide ketone)s can be varied as desired. Generally, the alkali metal sulfide (such as $Na_2S$), and the alkali metal hydrosulfide (such as NaSH), or the alkali metal hydroxide (such as NaOH) and the alkali metal hydrosulfide (such as NaSH), and the dihalobenzophenone, (such as 4,4' dichlorobenzophenone), can be added to a reactor vessel in any order. The polar organic solvent, (such as NMP), will generally be added to the reaction mixture following the addition of the aforementioned ingredients.

Although the reaction temperature at which the polymerization sis conducted can vary over a wide range, generally it will be within the range of about 125° C. to about 450° C., preferably about 175° C. to about 350° C., most preferably about 225° C. to about 275° C. The reaction time can vary widely, depending in part on the reaction temperature, but generally will be within the range of about 10 minutes to about 72 hours, preferably about 1 hour to about 20 hours. The pressure should be sufficient to maintain the the reaction mixture substantially in the liquid phase. The pressure will generally be within the range of about 0 psig to about 300 psig, preferably 150 to about 250 psig.

The polymer can be recovered as desired, preferably by removing the polymer and solvent from a cooled reactor and recovering the polymer by filtration. The polymer can be subsequently washed with water and dried in a vacuum oven.

EXAMPLES

Examples provided are intended to assist in a further understanding of my invention. Particular materials employed, species, conditions, are intended to be further illustrative of my invention and not limitative of the reasonable scope thereof.

EXAMPLE I

In this example the preparation of a poly(phenylene sulfide ketone) (PPSK) resin with equimolar amounts of NaSH and NaOH is described. To a 1-liter stainless steel reactor fitted with a double helical stirrer, nitrogen inlet tube, and rupture disc were charged: 41.63 grams of sodium hydrogen sulfide flakes (containing 58.17 weight-% NaSH, 0.35 weight-% $Na_2S$, and about 41.4 weight-% $H_2O$), 17.58 grams of sodium hydroxide pellets (98.2 weight-% NaOH, provided by Mallinckrodt, Inc., St. Louis, Mo.), 108.48 grams of 4,4'-dichlorobenzophenone (DCBP, provided by Aldrich Chemical Company, Milwaukee, Wisc.), and 343 grams (3.46 moles) of N-methyl-2-pyrrolidione (NMP). Thus an equal number of moles (0.432) of each of NaSH, NaOH, and DCBP were charged, and the molar $H_2O$: NaSH ratio was about 2.2:1.

The reactor was sealed, alternately pressured with 100 psig $N_2$ and then vented so as to remove air. The reactor mixture was then stirred and heated to about 250° C. (during a one hour period). This temperature was maintained for about 3 hours, while a pressure of about 180 psig was established. The reactor was then cooled to about 200° C., and 3 grams of DCBP plus 100 grams of NMP were charged for end-capping the formed PPSK polymer with DCBP. The reactor contents were again heated to about 250° C. and kept at that temperature for about 1 hour.

The polymer of this run (Run 1) was removed from the cooled reactor, recovered by filtration through a Buchner funnel, washed seven times with 2.5 liter aliquots of hot deionized water (about 70° C.), and dried in a vacuum oven at about 80° C. The inherent viscosity (IV) of the PPSK polymer measured at 30° C. in a #200 viscometer using a 0.5 weight-% solution in concentrated $H_2SO_4$ as solvent, was 0.45. Polymer yield was 73.6 grams.

In a second run (Run 2), an equimolar mixture of NaSH, NaOH, and DCBP in NMP was polymerized at essentially the same process conditions as described above, except that the mixture of NaSH, NaOH, $H_2O$, and NMP was first allowed to dehydrate at 0 psig and 160°-250° C. before all DCBP was added to the cooled reactor (about 105°), and no end-capping with DCBP was carried out. Then the reactor was sealed and heated at 250° C./130 psig for 3 hours. The inherent viscosity of the washed and dried PPSK polymer was 0.28.

Runs 3-8 reflect the preparation of PPSK employing increased molar ratios of NaSH relative to NaOH, otherwise essentially in accordance with the procedure of Run 1 (no dehydration; polymerization of 250° C. for 3 hours; end-capping with DCBP at 250° C. for 1 hour; molar $H_2O$: NaSH ratio of about 2.2:1).

Results are summarized in Table I:

TABLE I

| Run | Moles NaSH | Moles NaOH | Molar Excess of NaSH | Molar Ratio of NaSH to NaOH | (IV) Inherent Viscosity |
|---|---|---|---|---|---|
| 1 | 0.432 | 0.432 | 0 | 1:1 | 0.45 |
| 2 | 0.500 | 0.500 | 0 | 1:1 | 0.28 |
| 3 | 0.434 | 0.432 | 0.5% | 1.005:1 | 0.49 |
| 4 | 0.432 | 0.426 | 1.4% | 1.014:1 | 0.64 |
| 5 | 0.441 | 0.432 | 2.0% | 1.020:1 | 0.73 |
| 6 | 0.443 | 0.432 | 2.5% | 1.025:1 | 0.68 |
| 7 | 0.445 | 0.432 | 3.0% | 1.030:1 | 0.77 |
| 8 | 0.449 | 0.432 | 4.0% | 1.039:1 | 0.45 |
| 9 | 0.454 | 0.432 | 5.1% | 1.051:1 | 0.33 |

Runs 3-8 demonstrate that when a small defined molar excess of alkali metal hydrosulfide is used, the IV of the resultant polymer product will be equal to or greater than the IV of polymer products resulting from the use of a stoichiometric amount of alkali metal hydrosulfide NaSH (Runs 1 or 2) or the use of a larger excess (Run 9) of alkali metal hydrosulfide. The data, plotted in FIG. 1, show that PPSK polymers having an inherent viscosity of at least about 0.45 were obtained when a molar excess of NaSH (versus NaOH) of about 0.4% to about 3.8% was employed in the reaction mixture.

Thermal transitions were measured for the PPSK esin produced in Run 5 employing a Perkin-Elmer DAC-2C differential scanning calorimeter equipped vith a computerized data system and a Perkin-Elmer TADS-1 plotter. The polymer sample was heated at a ate of 20° C./minute.

Results obtained were: glass transition temperature Tg=144° C.; crystallization temperature Tc=191° C.; nelting temperature Tm=340° C.; melt crystallization emperature (upon cooling of the melt) Tmc=291° C.

EXAMPLE II

In this example, the preparation of PPSK, essentially n accordance with the procedure of Run 1 (Example I), mploying $Na_2S$ flakes (rather than NaSH and NaOH) s described. 56.88 grams of sodium sulfide flakes (conaining about 59.3 weight-% $Na_2S$, about 1.3 weight-% NaSH, and about 39.4 weight-% $H_2O$, equal to 0.432 noles of $Na_2S$[), plus], 0.013 moles of NaSH and 1.25 noles of water), were reacted with 0.432 moles of DCBP in the presence of 3.46 moles of NMP.

The presence of NaSH was equivalent to a molar NaSH excess of about 3%. The IV of the formed PPSK esin (about 89 grams yield) was 0.58. Therefore, the use of an alkai metal sulfide such as $Na_2S$, plus a defined light excess of alkali metal hydrosulfide, such as NaSH, clearly is effective and within the scope of this invenion.

EXAMPLE III

This example illustrates the curing of PPSK so as to urther increase its molecular weight. The dark-colored esin prepared in Run 6 was placed in an air oven heated o 316° C. The inherent viscosity of the polymer increased from an initial value of 0.68 to 0.84 after 30 ninutes, and to 0.97 after 60 minutes. After heating for bout 120 minutes, the polymer was no longer soluble in $H_2SO_4$. Degassing of the polymer during curing, especially during the first hour, was observed.

I claim:

1. A method for preparing a poly(arylene sulfide ketone) comprising:

contacting in a reaction mixture (a) at least one polyhalobenzophenone, employing about [1.004:1 to about 1.038:1 molar ratios] *0.004 to about 0.038 molar excess* of alkali metal hydrosulfide relative to said polyhalobenzophenone, and at least one of (b) or (c), wherein (b) is at least one alkali metal sulfide and at least one alkali metal hydrosulfide, and (c) is at least one alkali metal hydroxide and at least one alkali metal hydrosulfide, under polymerization conditions effective for producing the poly(arylene sulfide ketone);

2. The method of claim 1, wherein the polyhalobenzophenone comprises a dihalobenzophenone, and the reaction mixture includes a polar reaction medium.

3. The method of claim 2, employing [the] *about 0.01 to about 0.035 molar excess of said* alkali metal hydrosulfide [in a ratio of about 1.01:1 to about 1.035:1] relative to said polyhalobenzophenone, *and said* alkali metal hydroxide [and] *or said* alkali metal sulfide.

4. The method of claim 2, wherein the alkali metal hydrosulfide comprises sodium hydrosulfide, the alkali metal hydroxide comprises sodium hydroxide, the dihalobenzophenone comprises 4,4'dichlorobenzophenone, and the polar reaction medium comprises N-methyl-2-pyrrolidone.

5. The method of claim 4, wherein the poly(arylene sulfide ketone) is represented by repeating units of the structural formula:

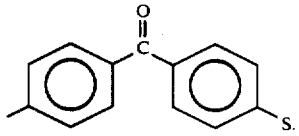

6. The method of claim 1, wherein the poly(arylene sulfide ketone) comprises poly(phenylene sulfide ketone).

7. The method of claim 6, employing said (c), wherein said alkali hydrosulfide is sodium hydrosulfide, and said alkali metal hydroxide is sodium hydroxide.

8. The method of claim 6, wherein the poly(phenylene sulfide ketone) exhibits an inherent viscosity of at least about 0.48 measured at 30° C. in a #200 viscometer using an 0.5 weight percent solution in concentrated $H_2SO_4$.

9. The method of claim 8, wherein the poly(phenylene sulfide ketone) exhibit an inherent viscosity of about 0.55 to about 0.77.

10. The method of claim 1, wherein the polymerization conditions include a temperature of about 175° C. to about 350° C., a pressure of about 0 psig to about 200 psig, and a reaction time of about 1 hour to about 72 hours.

11. The method of claim 1, employing said (b), wherein the alkali metal hydrosulfide is present in a [stoichiometric] *molar* excess of about [1.004:1 to about 1.038:1] *0.004 to about 0.038* over the alkali metal sulfide.

12. The method of claim 11, wherein the alkali metal [sulfide] *hydrosulfide* is brought together with the akali metal [hydrosulfide at] *sulfide in* a molar [ratio] *excess* of about [1.01:1 to about 1.035:1] *0.01 to about 0.035.*

* * * * *